J. E. GLEASON.
GEAR CUTTING MACHINERY.
APPLICATION FILED MAY 26, 1913.
1,325,784.
Patented Dec. 23, 1919.
5 SHEETS—SHEET 1.
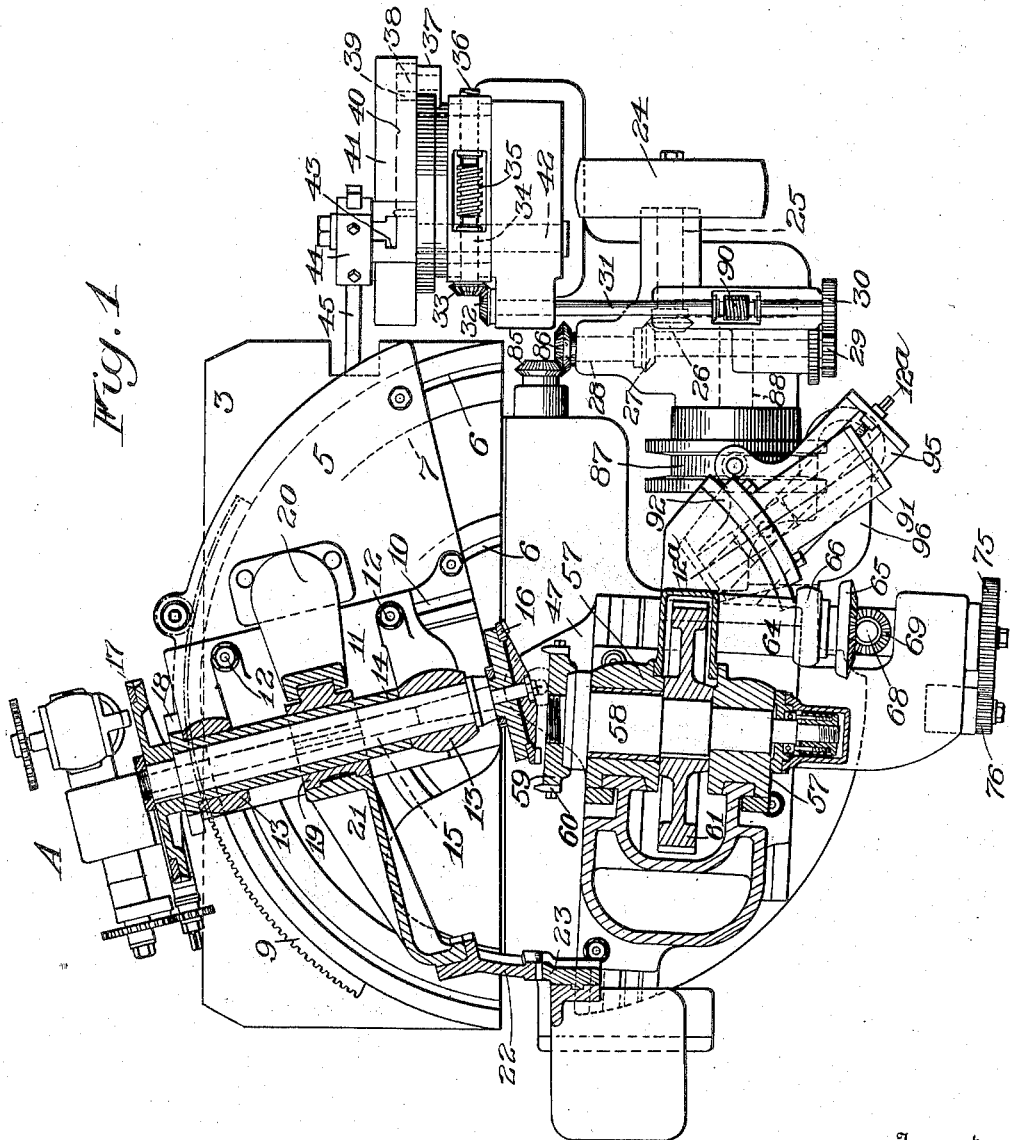
Inventor
James E. Gleason
Witnesses
By
his Attorneys

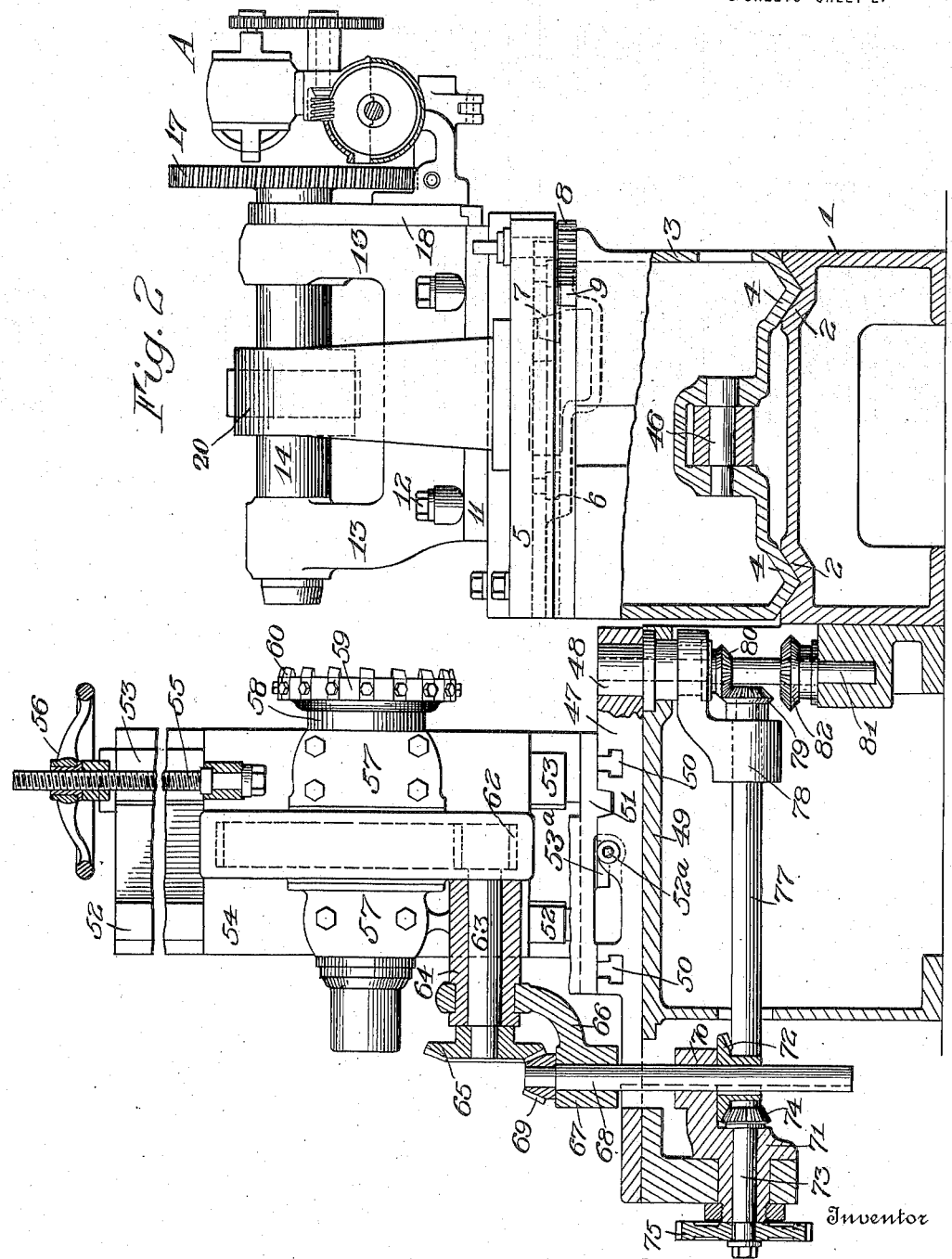

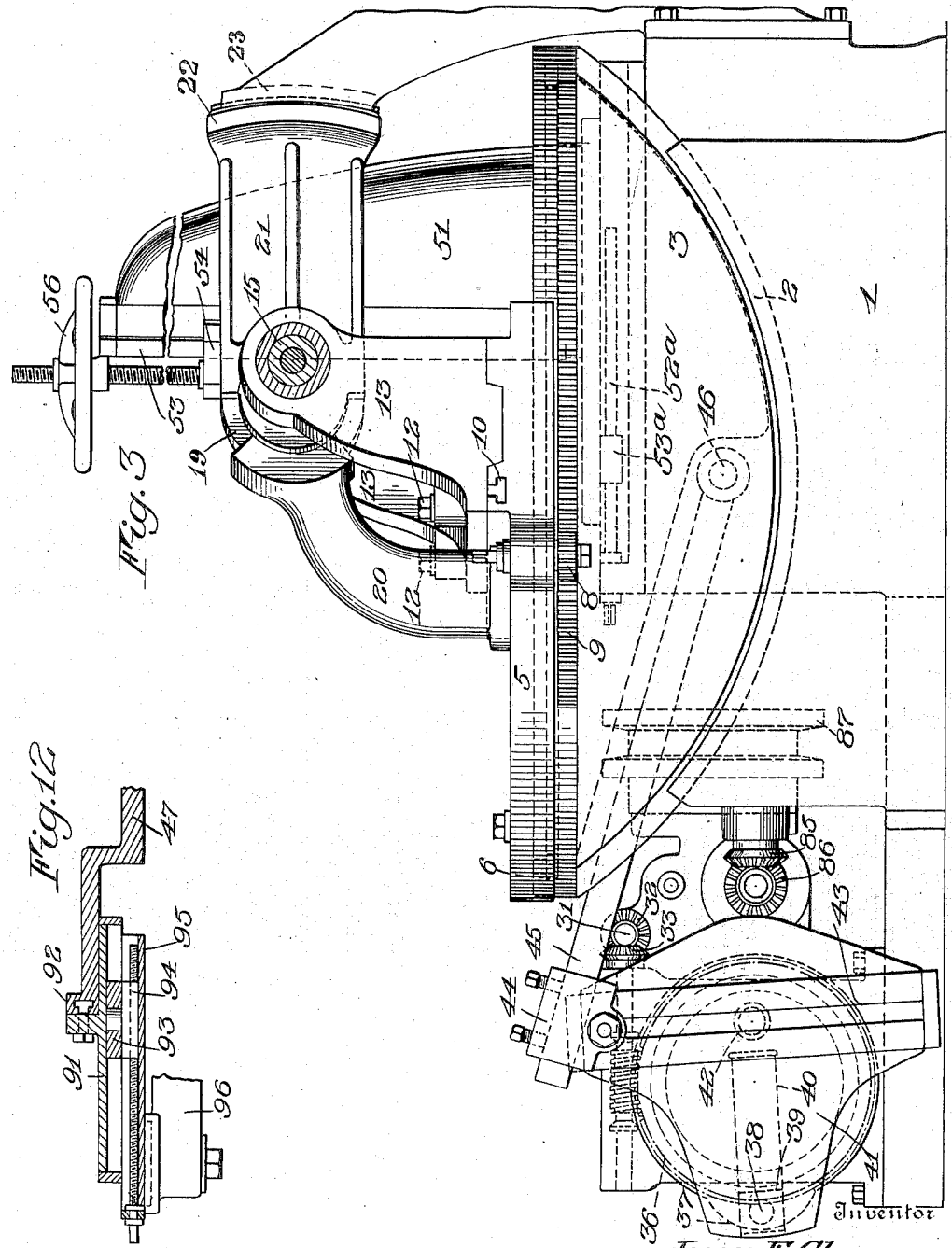

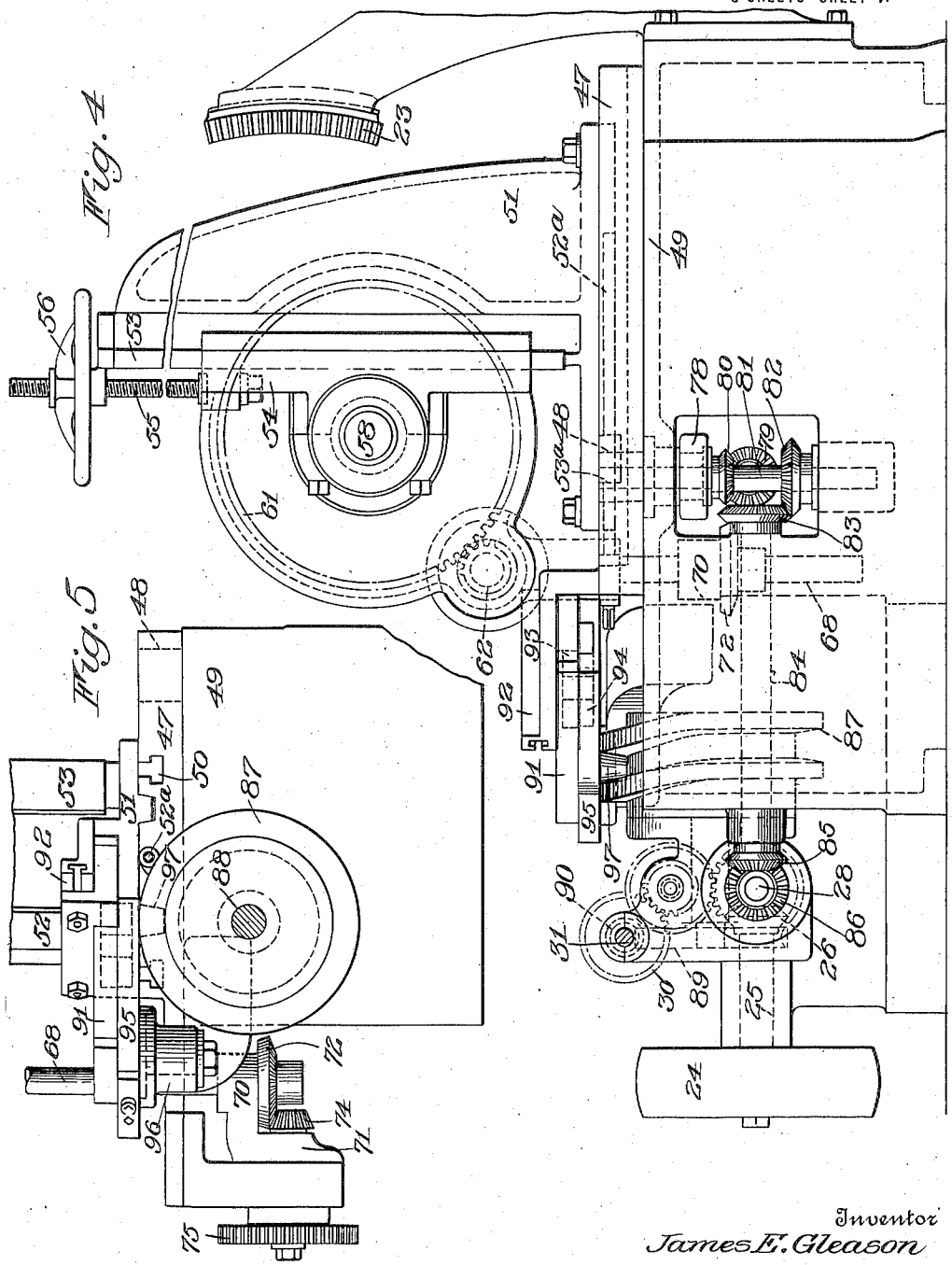

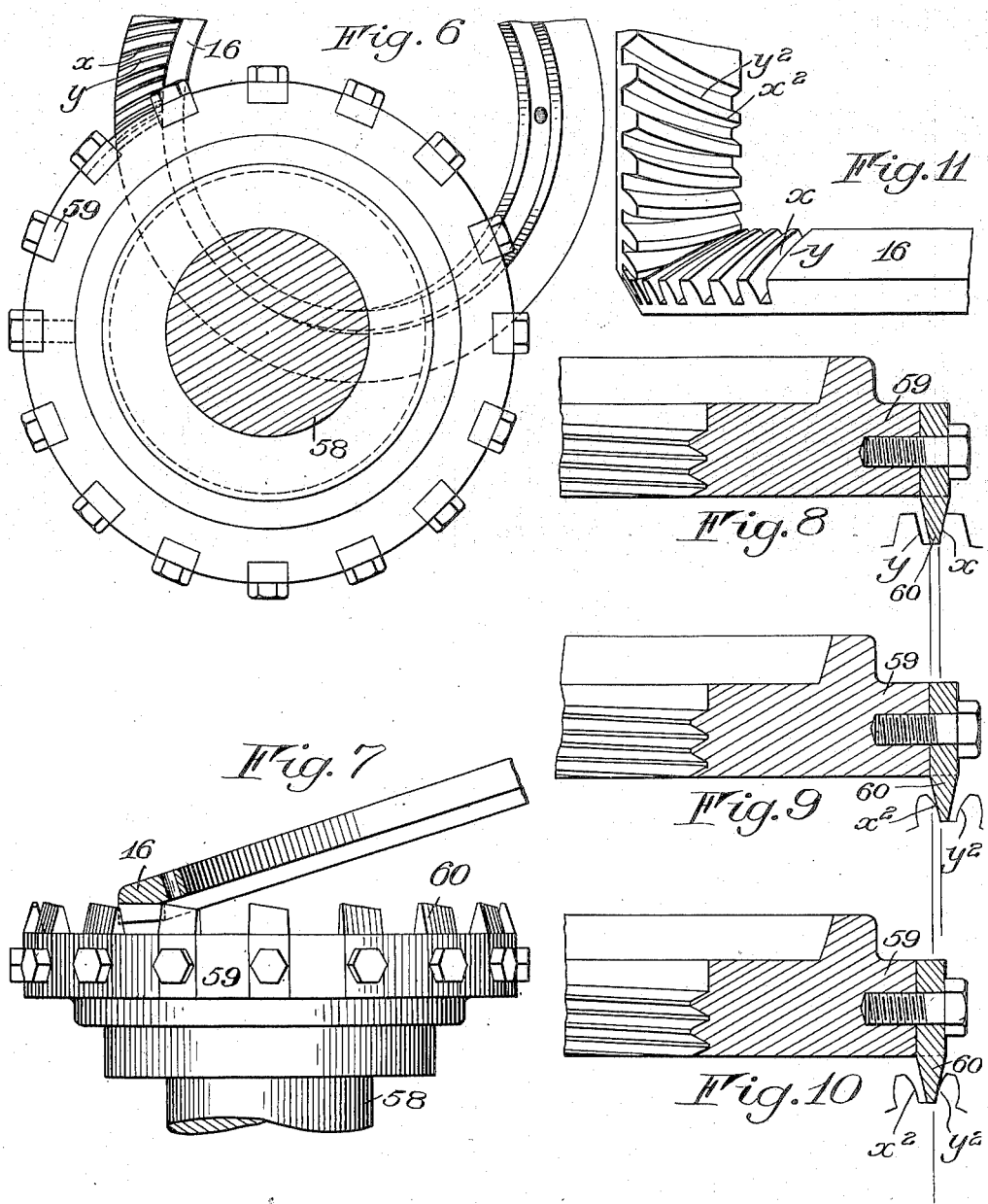

UNITED STATES PATENT OFFICE.

JAMES E. GLEASON, OF ROCHESTER, NEW YORK, ASSIGNOR TO GLEASON WORKS, OF ROCHESTER, NEW YORK, A CORPORATION OF NEW YORK.

GEAR-CUTTING MACHINERY.

1,325,784.  Specification of Letters Patent.  Patented Dec. 23, 1919.

Application filed May 26, 1913. Serial No. 769,808.

*To all whom it may concern:*

Be it known that I, JAMES E. GLEASON, of Rochester, in the county of Monroe and State of New York, have invented certain new and useful Improvements in Gear-Cutting Machinery; and I do hereby declare the following to be a full, clear, and exact description of the same, reference being had to the accompanying drawings, forming a part of this specification, and to the reference-numerals marked thereon.

My invention relates to gear cutting machinery, and while some of its features may be adopted in machines for cutting gears generally, it has special application in producing gears with helicoidal or curved teeth in the construction of what are sometimes known as spiral toothed gears. The main object of the invention resides in providing a machine capable of automatically generating curved or helicoidal teeth on bevel gears, in such a manner as to insure regular teeth of accurate formation, and in which the coöperating parts can be adjusted for cutting bevel gears having pitch cones of varying angularity. To these and other ends the invention consists in certain improvements and combinations of parts, all as will be hereinafter more fully described, the novel features being pointed out in the claims at the end of the specification.

In the drawings:

Figure 1 is a plan view, partly in horizontal section, of a machine constructed in accordance with one embodiment of my invention;

Fig. 2 is an end elevation of the same, partly in vertical section;

Fig. 3 is a side elevation, with the blank carrier in section;

Fig. 4 is a side elevation of the cutter-supporting and operating part of the machine;

Fig. 5 is a detail view in elevation of a portion of the cutter-controlling mechanism;

Fig. 6 is a detail plan view showing the cutter in its relation to the blank when forming a tooth;

Fig. 7 is an enlarged detail view, in side elevation, showing the cutter in its relation to a bevel gear blank, when forming a tooth;

Fig. 8 is a sectional view of a portion of a cutter, illustrating its position in the gear blank while operating on one face of a tooth;

Fig. 9 is a similar view illustrating a cutter operating upon the engaging face of the coöperating tooth of a gear designed to engage the gear shown in Fig. 8;

Fig. 10 is a view, similar to Fig. 9, showing a cutter operating on the adjacent face of the tooth next to the one shown in Fig. 9;

Fig. 11 is a view in side elevation, illustrating the manner in which the curved or helicoidal teeth of one bevel gear engage the corresponding teeth of a coöperating gear, and Fig. 12 is a detail sectional view on the line 12ᵃ—12ᵃ of Fig. 1.

Similar reference numerals throughout the several figures indicate the same parts.

It is an established fact in the art of gear making that intermeshing gears having teeth that are helicoidal or curved laterally in the direction of their length, produce a steadier and easier motion, with considerably less friction and less noticeable noise. This has been explained by reason of the operative faces on each tooth coming progressively into the plane of contact, whereas in a straight tooth, the entire tooth comes in the plane of contact at a single instant, followed by the next adjacent tooth, and so on. That is to say, in the so called spiral toothed gear, with curved or helicoidal teeth, the entire operative face of any tooth is never in the plane of contact at any one instant, but only a small portion thereof, followed by the next adjacent portion, and thereafter by the remaining portions of the operative face of the tooth progressively. Some machines have been devised and suggested for cutting curved teeth of this character, but so far, no practicably successful machine has been produced as far as I am aware, and it is my purpose to afford a mechanism for accomplishing the end set forth by means that will enable, further, the automatic generation on bevel gears of curved or helicoidal teeth having curved working faces.

Briefly, the machine embodies a blank supporting portion with means for obtaining a relative rolling motion between the work and the cutter for generating the curved faces of the teeth; and a cutter frame mounted so as to be moved into and out of cutting relation with the blank and provided with a cutter which is movable in a curvilinear path through the blank whereby to produce a tooth of a curvature corresponding to the path of movement of the cutter.

With this general description, I will now describe a preferred embodiment of my invention which is merely for the purpose of illustrating one method of carrying into effect the novel features, and is not intended in any sense as limiting the invention to the specific structure or arrangements that will hereinafter be set forth except as defined by the claims hereinafter. The blank supporting portion of the mechanism preferably embodies a bed 1, having curved ways 2, on which is arranged a cradle 3, provided with flanges 4 in engagement with the tracks or ways 2, and adapted to oscillate on the bed in the manner which will hereinafter be made clear. Supported on the cradle 3 is a base-plate 5, which is angularly adjustable thereon by means of the curved guideways 6 and guides 7, this adjustment being preferably effected by means of a pinion 8 carried by the base-plate 5 and having engagement with the curved rack 9 on the cradle. This enables the gear blank carrier to be adjusted for bevel gears having pitch cones with varying angles. The base-plate 5 is provided with a guide-way 10, which serves to permit adjustment of a bed plate 11, the latter being held in desired position on the base plate 5 by means of the nuts 12. The bed-plate 11 carries a pair of standards 13 which form bearings for the sleeve 14. The blank carrier is mounted in the said bearings, and embodies a shaft or blank arbor 15 to which the gear blank 16 may be attached in any convenient manner, as is usual in this class of devices. The shaft 15 carries at its outer end an index wheel 17 and the sleeve 14 is provided at its outer end with the downwardly projecting extension 18 carrying a suitable motor operated index mechanism which is designated generally at A, and coöperates with the index wheel 17. The latter is normally locked against movement in the sleeve 14, and is released at predetermined intervals and turned to index the blank for cutting successive teeth, as customary in automatic indexing machinery. Any suitable index mechanism may be employed for this purpose, such, for instance, as is illustrated in my prior patent of March 1, 1910, No. 950,766, and as the construction of this portion of the machine forms no part of my present invention, I have illustrated it only conventionally, and deem it unnecessary to describe in detail how the indexing of the blank is accomplished, further than to state that it is timed properly with movements of the cutter carrying frame, so that the blank may be turned automatically after an operating face of one tooth is completed, to bring into position the corresponding face of the next adjacent tooth to be cut. In order to effect a relative rolling motion between the blank and the cutter, the sleeve 14 carries a collar 19 splined or otherwise rigidly fixed thereon and which is suitably supported in a bracket 20 mounted on the base plate 5, and carries an arm 21 which is fixedly connected thereto in any suitable manner. The arm 21 carries a gear segment 22, adapted to engage a crown gear 23 suitably mounted on a stationary part of the machine, it being understood that the gear segment 22 corresponds to the pitch cone of blank 16 which is being cut, so that as the cradle 3 is moved back and forth on the bed, the gear blank will be rolled relatively to the cutter in the manner corresponding to the rolling of the segment 22 on the crown gear 23, thus imparting the proper curvature to the operating faces of the teeth.

The oscillation of the cradle 3 is effected in the following manner: 24 designates the main drive pulley mounted on the drive shaft 25 which carries a bevel pinion 26 in engagement with the coöperating pinion 27 on the shaft 28. The latter carries a gear 29 in engagement with an intermediate gear which drives gear 30 on the shaft 31 which is provided at its opposite end with a bevel gear 32 in engagement with a coöperating bevel gear 33 mounted on the worm shaft 34 which is provided with the worm 35. The latter drives a worm gear 36 to which is fixedly connected a projection 37 carrying a pin 38 in engagement with a block 39, slidably mounted in the recess 40 of the crank disk 41. The crank disk 41 is pivotally mounted at 42 and is slotted at 43 to accommodate an adjustably pivoted block 44 which carries a connecting rod 45, the latter being pivoted at 46 to the cradle 3. It will be seen that as the crank disk is rotated the cradle 3 is moved back and forth, or oscillated on the bed 2 whereby a rolling motion is imparted to the blank, and the parts are so timed that these movements will correspond to the movement of the cutter frame, as it is actuated into and out of operative relation with the gear blank, which I am now about to describe.

The cutter carrying frame embodies a bottom plate 47 pivotally mounted for swinging movement about the central post 48, the latter being suitably arranged in the stationary frame 49. The bottom plate 47 is provided with guide ways 50 to receive coöperating guide projections on the adjustable support 51, the lateral adjustment of said support on the bottom plate being obtained by means of a screw 52ᵃ in engagement with a nut 53ᵃ which is carried by the support. This permits a lateral adjustment of the cutter relatively to the blank carrier, while vertical adjustment may be obtained by having the cutter mounted on the support 51 in such a manner as to be held at different vertical positions thereon. To this end, the support 51 is provided with suitable tracks 52 and 53 which are engaged by the vertically movable slide 54, the latter carrying a threaded post 55 coöperating with a manually adjustable nut 56 on the support, whereby the slide may be raised and lowered to any desired position. Said slide is provided with suitable bearings 57 within which is mounted the spindle 58, which in the present embodiment carries the cutter. To meet the purposes of my invention, the cutter may be of any desired formation, so long as it has a cutting portion that travels in a curvilinear path and engages the gear blank lengthwise of the tooth to be formed, and although not limited to the precise structure disclosed, I may employ a cutter having a substantially annular cutting portion which is rotated through the blank. To this end, the cutter is mounted on the aforementioned spindle 58, and comprises a disk 59 provided with an annular cutting portion consisting of a plurality of cutting members 60 which are suitably attached to the disk 59 and extend in a direction parallel to its axis, so that when the cutter is rotated through the work, it will produce a tooth of a lengthwise curvature dependent upon the path of movement of the cutter, or in the present embodiment, upon the curvature of the annular cutting portion formed by the cutting members 60.

The cutter may be driven in any suitable manner, and this is preferably accomplished by providing a gear 61 fixed upon the spindle 58 and having engagement with the pinion 62 which is keyed to the shaft 63, the latter being journaled in the bearing 64 upon the slide 54 and carrying at its outer end a bevel gear 65. The bearing 64 carries a swiveled bracket 66 having at its lower end a bearing 67 within which is mounted a shaft 68 carrying a bevel pinion 69 in engagement with the previously mentioned bevel gear 65. The shaft 68 is slidably arranged in the bearing 70 formed on the bracket 71, and has splined thereon a bevel pinion 72. The bracket 71 is pivotally arranged in the stationary frame of the machine and has journaled therein a shaft 73 carrying at its inner end a bevel pinion 74 engaging the aforesaid bevel pinion 72 and provided at its outer end with the gear wheel 75. The gear 75 engages a pinion 76 mounted on the shaft 77 which is journaled in the swinging bracket 78 to permit shaft 77 to swing about the center 48 and carries a bevel pinion 79 engaging a corresponding pinion 80 fixed upon the centrally disposed shaft 81 which is driven in a manner that I will describe presently.

By this arrangement of gears and swinging bearings, I am able to adjust the cutter both vertically and laterally relatively to the blank carrier, while retaining driving connection in every position, and also to swing the cutter frame into and out of cutting engagement with the blank, as will be seen more clearly hereinafter. In order to operate the vertical shaft 81, I mount thereon a bevel gear 82 having engagement with the corresponding gear 83 on the shaft 84 which carries at its opposite end a bevel pinion 85. The shaft 28, previously described, which is operated from the main drive pulley 24, carries a pinion 86 in engagement with the pinion 85.

The cutter carrying frame is adapted to be oscillated in a horizontal plane about the center 48, in order to move the cutter into and out of coöperative engagement with the blank between the indexing movements of the latter, and this is preferably accomplished by a cam 87 which is mounted on the shaft 88, the latter being provided with a worm wheel 89 driven by the worm 90. The cam 87 is suitably formed, and so timed in its rotative movements, as to correspond with the oscillations of the cradle that carries the blank, and is operatively connected with the cutter carrying frame so as to oscillate the latter. To this end, the base plate 47 is provided with an extension 91, adjustable on the guide 92 and having a slot in which is mounted an adjustable block 93. The block 93 is pivotally connected with a corresponding block 94 which is adjustably arranged in a slot on the arm 95, the latter being pivoted on the bearing 96 and carrying the projection 97 engaging the cam 87. By this mechanism, the base plate is oscillated about its pivotal point at each rotation of the cam 87, the extent of throw being determined by the position of the adjustable blocks just described.

In Figs. 8 to 10, I have shown diagrammatically the theoretical method of cutting the teeth for two intermeshing gears of different diameters, and the cutters to be employed for the same, according to the present invention. Since, in the present embodiment, the longitudinal curvature of the tooth is determined by the arc of a circle, it will be apparent that the radius of the circle on which one face of a tooth is cut is different from the radius of the circle on which the adjacent face of the next tooth is cut. This is illustrated in Fig. 8, where the tooth face $x$ is formed on a circle having a greater radius than the face $y$. In the coöperating gear shown in Figs. 9 and 10, the face $x^2$ will engage the face $x$, and face $y^2$ will engage face $y$. Hence, in order that the coöperating faces on the respective gears shall engage each other properly, they must be cut on circles having the same radius. That is to say, the radius of the curvature for face $x$, must be the same as that of $x^2$, and the radius of the curvature of face $y$, must be the same as that of $y^2$. So that in cutting two gears such as indicated, three differently sized cutters will be employed, to obtain theoretically correct engaging faces for the teeth.

The operation of the machine, briefly described, is as follows: the blank carrier and cutter are first adjusted to proper cutting position, in accordance with the pitch-cone of the gear, as appears in Fig. 1. The machine is then set in operation, and while the cutter 59 rotates continuously through the blank, the cradle 3 on which the blank is mounted, rocks slowly first in one direction and then in the other, to roll the blank through the cutter. During this alternate rolling motion of the cradle, the gear blank is rotated about its axis by means of the segment 22 and crown gear 23. The generating motion is intended for finishing a tooth surface which has previously been roughed out on another apparatus, and the cutter will have completed one face of a tooth from top to bottom when the cradle 3 shall have completed one oscillation, or in other words, shall have rocked back and forth once, and reached its initial position. Thereupon, the cutter frame 47 is automatically oscillated about the center 48 to withdraw the cutter from the blank, which latter is then indexed to bring another tooth surface into cutting position. The cutter frame is then returned to cutting position and the operation repeated.

I claim as my invention:

1. In a machine for cutting curved gear teeth, the combination with a dished bed, of a cradle movable on said bed, a blank carrier mounted on the cradle, a toothed segment adapted to rotate with the blank carrier, a stationary gear in engagement with the gear segment, means for moving the cradle, a pivotally mounted frame, a cutter arranged on the frame and provided with a substantially annular cutting portion which is movable through the blank lengthwise of the tooth to be formed, means for rotating the cutter on the frame, and means for oscillating the frame about its axis.

2. In a machine for cutting curved teeth on bevel gears, the combination with a curved bed, of a cradle movable on said bed, a blank carrier mounted on the cradle and angularly adjustable thereon for changing the position of the blank carrier relatively to the cutter, a toothed segment adapted to rotate with the blank carrier, a stationary gear in engagement with the segment, means for moving the cradle, a pivotally mounted frame, a rotating cutter arranged on the frame having its axis disposed at an angle to the blank carrier, said cutter being provided with a substantially annular cutting portion which is movable through the blank lengthwise of the tooth to be formed, means for rotating the cutter on the frame, and means for oscillating the frame about its axis.

3. In a machine for cutting curved gear teeth, the combination with a dished bed, of a cradle movable on said bed, a blank carrier mounted on the cradle, a toothed segment adapted to rotate with the blank carrier, a stationary gear in engagement with the segment, means for moving the cradle, a pivotally mounted frame, a cutter arranged on the frame and embodying a rotary support having a plurality of cutting members attached thereto, said cutting members extending from the support in a direction substantially parallel to its axis and movable through the blank lengthwise of the tooth to be formed, means for rotating the cutter on the frame, and means for oscillating the frame about its axis.

4. In a machine for cutting curved teeth on bevel gears, the combination with a curved bed, of a cradle movable on said bed, a blank carrier mounted on the cradle and angularly adjustable thereon for changing the position of the blank carrier relatively to the cutter, a toothed segment adapted to rotate with the blank carrier, a stationary gear in engagement with the segment, means for moving the cradle, a pivotally mounted frame, a rotating cutter arranged on the table having its axis disposed at an angle to the blank carrier, said cutter embodying a rotary support and having a plurality of cutting members attached thereto, said cutting members extending from the support in a direction substantially parallel to its axis and movable through the blank lengthwise of the tooth to be formed, means for rotating the cutter on the frame, and means for oscillating the frame on its axis.

5. In a machine for cutting curved gear teeth, the combination with a dished bed, of a cradle movable on said bed, a blank carrier mounted on the cradle, a toothed segment adapted to rotate with the blank carrier, a stationary gear in engagement with the segment, means for moving the cradle, a pivotally mounted frame, a cutter arranged on the table and embodying a cutting portion which is movable through the blank in a curvilinear path lengthwise of the tooth to be formed, means for advancing the cutter through the work, and means for oscillating the frame about its axis.

6. In a machine for cutting curved teeth on bevel gears, the combination with a curved bed, of a cradle movable on said bed, a blank carrier mounted on the cradle and angularly adjustable thereon for changing the position of the blank carrier relatively to the cutter, a toothed segment adapted to rotate with the blank carrier, a stationary gear in engagement with the segment, means for moving the cradle, a pivotally mounted frame, a cutter embodying a cutting portion which is movable through the blank in a curvilinear path lengthwise of the tooth to be formed, means for advancing the cutter through the blank, and means for oscillating the frame about its axis.

7. In a gear cutting machine, the combination with a dished bed, of a cradle movable on the bed, a blank carrier mounted on the cradle, a toothed segment adapted to rotate with the blank carrier, a stationary gear in engagement with the toothed segment, means for actuating the cradle, a pivotally mounted frame, a cutter arranged on the frame, means for operating the cutter, and means for oscillating the frame.

8. In a machine for cutting bevel gears, the combination with a dished bed, of a cradle movable on the bed, a blank carrier mounted on the cradle and angularly adjustable to change its position relatively to the cutter, a toothed segment adapted to rotate with the blank carrier, a stationary gear in engagement with the toothed segment, means for actuating the cradle, a pivotally mounted frame, a cutter arranged on the frame, means for operating the cutter, and means for oscillating the frame.

9. In a machine for cutting curved gear teeth, the combination with a dished bed, of a cradle movable on said bed, a pivotally mounted frame, a blank carrier mounted on one of said parts and a cutter arranged on the other of said parts and embodying a substantially annular cutting portion movable through the blank lengthwise of the tooth to be formed, and means for rotating the cutter through the blank.

10. In a machine for cutting curved teeth on bevel gears, the combination with a curved bed, of a cradle movable on said bed, a pivotally mounted frame, a blank carrier mounted on one of said parts and a rotating cutter arranged on the other of said parts, the cutter being provided with a substantially annular cutting portion movable through the blank lengthwise of the tooth to be formed, means for rotating the cutter, and means for effecting movement of said frame.

11. In a machine for cutting curved gear teeth, the combination with a dished bed, of a cradle movable on said bed, a pivotally mounted frame, a blank carrier mounted on one of said parts and a cutter arranged on the other of said parts, the cutter embodying a rotary support having a plurality of cutting members extending from the support in a direction substantially parallel to its axis and movable through the blank lengthwise of the tooth to be formed, and means for rotating the cutter.

12. In a machine for cutting curved gear teeth, the combination with a dished bed, of a cradle movable on said bed, a pivotally mounted frame, a blank carrier mounted on one of said parts and a cutter arranged on the other of said parts and embodying a cutting portion movable through the blank in a curvilinear path lengthwise of the tooth to be formed, and means for advancing the cutter through the work.

13. In a gear cutting machine, the combination with a dished bed, of a cradle movable on the bed, a pivotally mounted frame, a blank carrier mounted on one of said parts and a cutter arranged on the other of said parts, means for operating the cutter, and means for effecting movement of the frame.

14. A machine for cutting curved gear teeth comprising an oscillatory support, a frame movable toward and from the oscillatory support, a blank carrier mounted upon one of said parts and a cutter arranged on the other of said parts and embodying an annular cutting portion rotatable through the blank.

15. A machine for cutting curved gear teeth comprising an oscillatory support and a frame, a blank carrier mounted on one of said parts and a cutter arranged on the other of said parts and embodying an annular cutting portion rotatable through the blank, and means for effecting relative movement of the cutter and blank carrier, one toward and from the other, to permit indexing of the blank.

JAMES E. GLEASON.

Witnesses:
H. E. STONEBRAKER,
RUSSELL B. GRIFFITH.